March 16, 1948.  A. D. FALKOFF  2,437,947
MOUNTING FOR AND INCLUDING OPTICAL REFRACTING
MEANS AND METHOD OF FORMING THE SAME
Filed Feb. 17, 1944
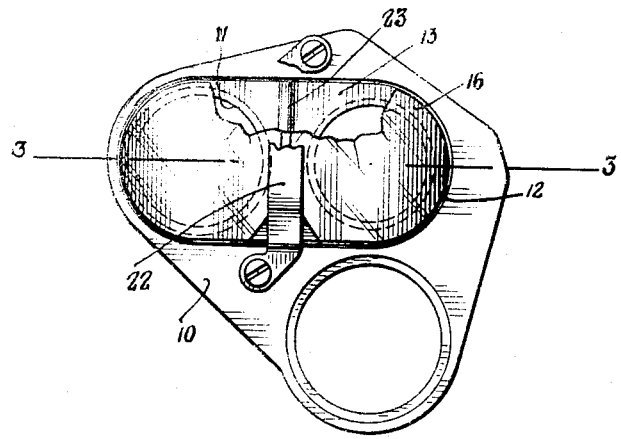
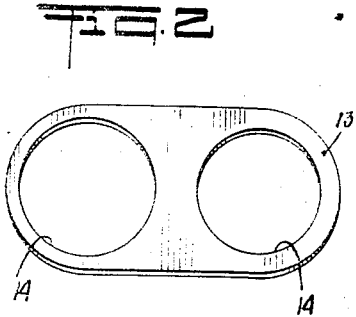
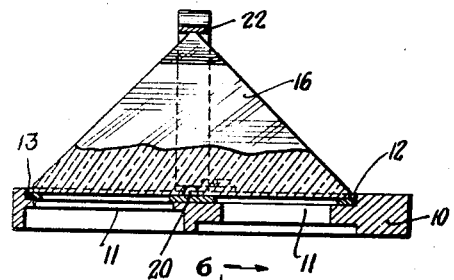
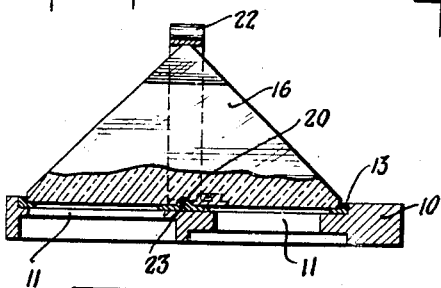
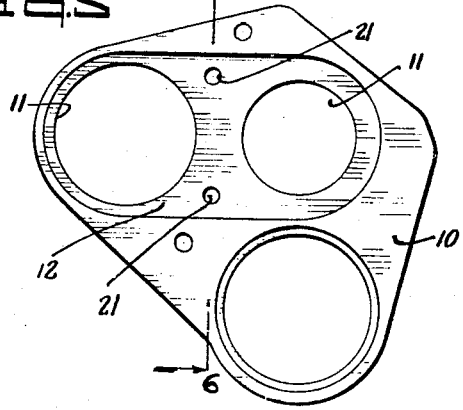
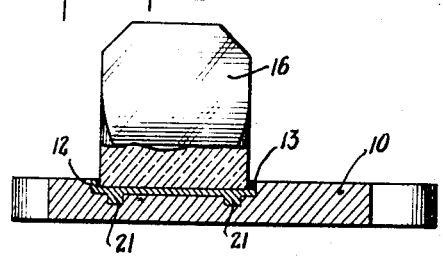
INVENTOR.
Aden Daniel Falkoff
BY
ATTORNEY Patented Mar. 16, 1948

2,437,947

UNITED STATES PATENT OFFICE 2,437,947

MOUNTING FOR AND INCLUDING OPTICAL REFRACTING MEANS AND METHOD OF FORMING THE SAME

Adin Daniel Falkoff, Brooklyn, N. Y., assignor to Universal Camera Corporation, New York, N. Y., a corporation of New York Application February 17, 1944, Serial No. 522,828

14 Claims. (Cl. 88—1)

1

This invention generally relates to mountings for optical elements, and is more specifically directed to a novel method for mounting in precision instruments prismatic elements having flat surfaces.

In the mounting of all optical elements in precision instruments, there arises the problem of adjusting the elements to the position required for proper operation of the instrument and of maintaining the positioned elements in place. In the particular instance of prismatic elements having flat surfaces and mounted in juxtaposition, the general solution of the problem has been found in the use of a supporting member or shelf, which is provided with suitable apertures in accordance with the optical requirements of the instrument and carries the prisms fastened to opposite faces of the shelf. This latter may be integral with the mechanical structure of the instrument, or may be detachably secured thereto, as by means of screws or the like, but in any event the prisms must be adjusted on the shelf to the proper position relative to each other and to the shelf.

It is therefore the primary object of this invention to provide a method and means for mounting optical elements, such as prisms and the like, in precision instruments, whereby the disadvantages inherent in the methods practiced up to the present time may be overcome, and, particularly, any danger of damage to the frangible prism material is eliminated, while the mounting process is considerably simplified and generally speeded up, and the removal and resetting of the prisms is rendered possible without further adjusting operations.

More specifically, it is an object of the invention to provide a method whereby the optical elements are adjusted and set in the mounting under heat, and the use of the aforementioned mechanical means is entirely dispensed with.

Further, the novel method comprises the use of a suitable thermoplastic element incorporated in the mounting, on which the prism is adjusted to position, and the treatment under heat of said element to unite the various parts of the mounting in fixed relation to each other.

It is another object of the invention to effect the formation in the aforementioned plastic material of an impression of the base of the optical element, after this latter has been adjusted to position, so as to provide a seat for said optical element and permanently define its correct position in the mounting under all conditions that may be encountered in the normal use of the instrument.

The invention also aims at providing means incorporated in the mounting and adapted to function as a cushion for the optical element so as to minimize danger of breakage of the optical element due to shocks during use of the instrument.

These and other objects of the invention will become apparent in the following description, in which reference is had to a particular type of optical element shown in the drawings, specifically a Porro prism, it being however understood that the method is not to be considered limited to the mounting of such particular prisms, but may be advantageously applied to different optical elements.

In the drawings:

Fig. 1 is a plan view of a complete mounting incorporating a prism adjusted to position upon a shelf according to the novel method.

Fig. 2 is a plan view of a thermoplastic washer, or base, used in the practicing of the method.

Fig. 3 is a vertical section through the mounting, on line 3—3 of Fig. 1, showing the assembled parts in an intermediate stage of the performance of the method.

Fig. 4 is a similar vertical sectional view illustrating the assembled parts as they appear in the final stage of the method, with the prism in adjusted position and in engagement with a seat formed in the washer of Fig. 2.

Fig. 5 is a plan view showing a modified form of the shelf.

Fig. 6 is a vertical section, on line 6—6 of Fig. 5, illustrating the thermoplastic washer and the prism in the final stage of the method, assembled with the shelf of Fig. 5.

Referring now in detail to the drawings, numeral 10 indicates a prism supporting member, or metal shelf of standard type, adapted to be mounted in an optical instrument and having suitable aperatures 11, positioned and dimensioned in accordance with the optical requirements. The shelf 10 has a recessed portion 12, adapted to accommodate a washer-like element 13 disposed therein with its apertures 14 in registration with the apertures 11 of the shelf, to which it may be adhesively secured, if desired.

Said washer 13, which has a smooth surface and is made of material softer than the prism and the metal of the shelf and possessing certain properties that will be hereafter described, functions as a base for an optical prism 16, which is placed upon the washer to be adjusted to position in the mounting. The washer, which, as shown in Figs. 3 and 4 is slightly larger than the base of the prism, has a contour corresponding to the contour of said base and a thickness (shown somewhat exaggerated in the figures for the purpose of illustration) sufficient to permit the formation therein, in a final stage of the method, of an impression of the base of the prism, to provide a seat for the prism, as it will be described.

The washer is made of thermoplastic material having certain properties that are essential for the practicing of the method, that is, the material (though relatively soft, as compared with the glass and the metal of the shelf, as aforementioned) must be hard and rigid at normal temperatures up to approximately 140° F., yet adapted to become soft and to be easily worked at somewhat higher temperatures. Desirable properties are, furthermore, the following: low coefficient of thermal expansion, stability and retention of mechanical strength at low temperatures, low rate of water absorption, and good aging characteristics. A commercial thermoplastic material having the aforementioned requisites is, for instance, one of the vinyl resins, which is available on the market in sheets of suitable thickness.

In the practicing of the method, the prism 16 is superimposed upon the washer or base 13, arranged in the recessed portion 12 of shelf 10 as described, and a light load is applied to the apex of the prism, which is then manually adjusted to position, the smooth surface of the washer permitting to displace the prism relative to the washer, as required for its adjustment.

The next step in the mounting process consists in treating the washer under heat, to interconnect the various parts of the assembly in fixed position relative to each other through the deformation or flow of the thermoplastic material and the consequent formation therein of surfaces in conforming engagement with the adjacent surfaces of the shelf and the prism.

For this purpose, the assembled components of the mounting may be placed in an oven, to bring the washer to the desired temperature; preferably, however, the heating of the washer is effected by conduction from the shelf (for instance, by induction heating) so as to maintain the optical element cool. The washer is heated and softened to the extent required to permit the prism 16 disposed thereon in its adjusted position, to settle by gravity in the thermoplastic material to produce an impression therein (see Fig. 4), molding the material to form a seat 18 having a contour corresponding to the contour of the base of the prism, while the softened material is concurrently caused to fill a groove 20, provided in the base of the prism transversely thereof and to form a ridge 23 in interengagement with said groove, so that the prism and the washer are interconnected and their relative position is univocally determined. Simultaneously, the plastic material is caused to spread laterally and urged against the peripheral wall of the recessed portion 12 of the shelf with which it is obliged to conform, becoming therefore united to said recessed portion as in a force-fit and thereby completing the interconnection of the assembled parts of the mounting.

Normally, the weight of the optical element will be sufficient to insure the attainment of the results described; however, in some instances it may be necessary to apply a moderate pressure on the prism during the heating operation to insure the production of an adequately deep impression in the plastic material; or it may be desirable to apply such a pressure in order to prevent any possible danger of lateral displacement of the prism while the molding of the plastic material is being accomplished.

After the thermoplastic material has been molded, as hereinbefore described, the assembly is permitted to cool to normal temperature, and it will then be found that the glass material does not adhere to the plastic and therefore the prism is not subjected to objectionable strains. Obviously, after the cooling the prism may be removed and placed again in the mounting whenever desired without affecting its adjustment, since the plastic material is permanently united to the shelf and the seat 18 permanently defines the adjusted position of the prism.

The prism is maintained in assembled relation with the seat-embodying washer and the shelf in any suitable manner as, for instance, by means of a metal band 22 fastened to the shelf and exerting a moderate resilient pressure on the apex of the prism, and this band may serve as a means for applying pressure to the prism, during the heat treatment, for the purposes aforementioned.

Figs. 5 and 6 illustrate a modification of the invention according to which the recessed portion 12 of the shelf 10 is provided, at its bottom, with indentations 21. As will be apparent, the softened thermoplastic material is caused to flow into such indentations during the heat treatment, so that the washer 13 is locked to the shelf both through its peripheral engagement with the wall of the recessed portion 12 and through its engagement with said indentations, thereby further enhancing the security of the connection. Alternatively, when such indentations are used, a flat shelf may be employed, as the interengagement of the plastic material with said indentations affords a sufficiently firm connection; however, a shelf having a recessed portion, as described, is, in practice, preferred.

It should be noted that the washer 13 need not be changed when a new optical element is to be mounted on the shelf, since thermoplastic materials, such as the aforementioned vinyl resin, have also the property that they can be restored roughly to their original shape by treating them for a few minutes in boiling water, or otherwise heating them to a corresponding temperature. Furthermore, it will be apparent that owing to the relative softness of the plastic washer, as compared with the metal shelf, the washer will substantially function also as a cushion for the prism against shocks transmitted through the mechanical structure.

In the foregoing description reference has been had to a thermoplastic element having substantially the form of a washer; it is, however, to be understood that the method contemplates the use of different forms of thermoplastic elements, and, in general, any assembly wherein a prism or other optical element, is allowed to form, under heat, an impression in a thermoplastic material, whereby the prism is connected to the assembly and its adjusted position in the mounting is defined. Likewise, it will be apparent that, although an assembly incorporating a single prism has been described, a plurality of optical elements may be adjusted and secured to a shelf in identical manner, and other changes and modifications may be made in the method and in the means illustrated without departing from the spirit of the invention or exceeding the scope of the claims.

I claim:

1. A method of mounting an optical element on a support for assembly in an optical instrument, which comprises superimposing a flat thermoplastic element upon the support, placing the optical element upon said thermoplastic element and adjusting the same thereon by movement substantially parallel to the plane of said thermoplastic element to its final position relative to the support, heating the thermoplastic element to soften the same, and producing in the softened thermoplastic element an impression of the base of the optical element to form a depressed recess defining continuous wall surfaces bounding the periphery of said base and adapted to separably maintain the optical element in said adjusted position thereof.

2. A method of mounting an optical element on an apertured shelf for assembly in an optical instrument, which comprises superimposing upon the shelf a thin flat thermoplastic element having apertures conforming to the apertures of the shelf, placing the optical element upon said thermoplastic element inwardly of the periphery thereof and adjusting the same thereon by movement substantially parallel to the plane of said thermoplastic element to its final adjusted position relative to the shelf, softening the thermoplastic element and causing the optical element to produce therein, under the force of gravity, an impression of its base to form a depressed recess defining continuous wall surfaces bounding the periphery of said base and adapted to separably maintain the optical element in said adjusted position thereof.

3. A method of mounting an optical prism on an apertured shelf for assembly in an optical instrument, which comprises superimposing upon the shelf a thermoplastic washer having apertures conforming to the apertures of the shelf, placing the prism upon said washer inwardly of the periphery thereof, applying a moderate pressure to the prism and simultaneously adjusting the same on the washer by movement substantially parallel to the plane of the washer to its final adjusted position relative to the shelf, then heating the washer to soften the same, and producing therein an impression of the base of the prism to form a depressed recess defining continuous wall surfaces bounding the periphery of said base and adapted to separably maintain the prism in said adjusted position thereof.

4. A method of mounting an optical prism on an apertured shelf for assembly in an optical instrument, which comprises superimposing upon the shelf a thin thermoplastic washer having apertures conforming to the apertures of the shelf, placing the prism upon said washer inwardly of the periphery thereof, applying a moderate pressure to the prism and simultaneously adjusting the same on the washer by movement substantially parallel to the plane of the washer to its final position relative to the shelf, then heating the thermoplastic washer to soften the same, and causing the prism to produce in the washer, by gravity and external pressure concurrently applied to the prism, an impression of its base depressed to form a recess defining continuous wall surfaces bounding the periphery of said base and to separably maintain the prism in said adjusted position thereof.

5. A method of mounting an optical prism for assembly in an optical instrument, which comprises providing a shelf having apertures and recessed portions therein, placing upon the shelf, in superimposed relation to said recessed portions thereof, a thermoplastic element having apertures conforming to the apertures of the shelf, placing the prism upon said thermoplastic element inwardly of the periphery thereof and adjusting the same thereon by movement substantially parallel to the plane of said thermoplastic element to its final position relative to the shelf, then softening the thermoplastic element and forcing portions of the softened element into locking engagement with said recessed portions of the shelf, while simultaneously producing in the element an impression of the base of the prism to form a recess defining surfaces bounding the periphery of said base adapted to separably maintain the prism in said adjusted position thereof.

6. A method of mounting an optical prism for assembly in an optical instrument, which comprises providing a shelf having a recessed apertured portion, superimposing upon the bottom of said portion a thermoplastic element and having apertures conforming to the shelf apertures, placing the prism upon said thermoplastic element inwardly of the periphery thereof in the proper position relative to said shelf, heating the element to soften the same, causing the prism to deform the softened element to force portions thereof into conforming engagement with the peripheral wall of the recessed portion of the shelf to lock the element therein, and simultaneously producing in the element an impression of the base of the prism to form a depressed recess defining continuous wall surfaces bounding the periphery of said base and adapted to separably maintain the prism in said proper position thereof.

7. A method of mounting an optical prism for assembly in an optical instrument, which comprises providing a shelf having apertures and recessed portions therein, superimposing upon the shelf a flat thin thermoplastic element having apertures conforming to the apertures of the shelf, placing a prism having a transverse recess in the base thereof upon said element and adjusting said prism on the element by movement substantially parallel to the plane of this latter to its ultimate position relative to the shelf, then heating the thermoplastic element to soften the same, and molding the softened element to simultaneously form therein portions in conforming engagement with the recessed portions of the shelf and the recess in the base of the prism and a recess defining surfaces bounding the periphery of the prism base.

8. A mounting for and including a light refracting element comprising a supporting shelf having openings therein, a flat thermoplastic element extending on said shelf having openings registering with the openings of the shelf and portions in engagement with surfaces of the shelf to maintain the thermoplastic element in fixed position on the shelf, an optical refracting element having a base superimposed upon said thermoplastic element in optically adjusted position and separated thereby from the shelf surface, a depressed recess in the thermoplastic element for the base of the optical element defining continuous wall surfaces bounding the periphery of said base and separably retaining the optical element in its adjusted position, and means for maintaining the optical element in assembled relation with the thermoplastic element.

9. A mounting for and including an optical prism comprising a supporting shelf having openings and recesses therein, a thermoplastic washer extending on said shelf having openings registering with the openings of the shelf and portions engaging said recesses to maintain the washer in fixed position on the shelf, an optical prism having a substantially flat base superimposed upon said washer in optically adjusted position and separated thereby from the shelf surface, a depressed recess in the washer for the base of the adjusted optical prism defining continuous wall surfaces bounding the periphery of said base and separably retaining the prism in its adjusted position, and means for maintaining the prism in assembled relation with the washer.

10. A mounting for and including an optical prism comprising a supporting shelf having spaced openings therein, a flat thermoplastic element extending on said shelf having openings registering with the openings of the shelf and portions in engagement with surfaces of the shelf to maintain the thermoplastic element in fixed position in the shelf, an optical prism having a substantially flat base superimposed upon said thermoplastic element in optically adjusted position on the shelf, an optical prism having a subface, said prism having a central transverse groove in its base, the thermoplastic element being formed with a depressed recess for the base of the prism defining continuous wall surfaces bounding the periphery of said base and with a ridge in said recess engaging said groove in the prism base to separably retain the prism in its adjusted position, and means surrounding the prism and connected to said shelf for maintaining the prism in assembled relation with the thermoplastic element.

11. A mounting for and including a light refracting element comprising a supporting shelf, a recessed portion in said shelf, a flat thermoplastic element superimposed upon the bottom of said recessed portion and engaging the peripheral wall thereof so as to be secured within the recessed portion, an optical refracting element having a base of smaller area than the area of said thermoplastic element superimposed upon the thermoplastic element in optically adjusted position and separated thereby from the shelf, a depressed recess in the thermoplastic element for the base of the optical element defining continuous wall surfaces bounding the periphery of said base and separably retaining the optical element in assembled relation with the thermoplastic element.

12. A method of mounting a light-passing optical element for assembly in an optical instrument, which comprises providing a support having at least a recess therein, placing a flat thermoplastic element upon said support, placing the optical element upon said thermoplastic element and adjusting the same thereon to its final adjusted position relative to the support, heating the thermoplastic element to soften the same, causing the adjusted optical element to deform the softened thermoplastic element to form therein a portion engaging said recess of the support and a recessed portion receiving the base of the optical element adapted to separably retain the optical element in adjusted position, allowing the thermoplastic element to harden to permanently define said recess therein, and separably locking the optical element in invariable positioned relationship with respect to the thermoplastic element.

13. A method of mounting an optical prism on an apertured shelf for assembly in an optical instrument, which comprises superimposing upon the shelf a thermoplastic washer having apertures conforming to the apertures of the shelf, said shelf having indentations in the portion thereof contacted by said washer, placing the prism upon said washer inwardly of the periphery thereof, applying a moderate pressure to the prism and simultaneously adjusting the same on the washer by movement substantially parallel to the plane of the washer to its final adjusted position relative to the shelf, then heating the washer to soften the same, causing the prism to produce in the softened washer, by gravity and external pressure concurrently applied to the prism, an impression of its base to form a recess defining surfaces bounding the periphery of said base to separably maintain the prism in said adjusted position thereof, and concurrently causing the softened washer under the pressure exerted by the prism substantially to fill said identations of the shelf, whereby the washer becomes locked to the shelf.

14. A mounting for and including an optical prism comprising a supporting shelf having spaced openings therein and a plurality of indentations formed intermediate of said openings, a flat thermoplastic element extending on said shelf having openings registering with the openings of the shelf and perpendicularly projecting portions in engagement with the depressions of the shelf to maintain the thermoplastic element in fixed position on the shelf, an optical prism having a substantially flat base superimposed upon said thermoplastic element in optically adjusted position and separated by said thermoplastic element from the shelf surface, a depressed recess in the thermoplastic element for the base of the adjusted optical prism defining continuous wall surfaces bounding the periphery of said base and separately retaining the prism in its adjusted position, and means surrounding the prism and connected to said shelf for maintaining the prism in assembled relation to the thermoplastic element.

ADIN DANIEL FALKOFF.

REFERENCES CITED

The following references are of record in the file of this patent:

UNITED STATES PATENTS

| Number | Name | Date |
|---|---|---|
| 1,338,241 | Meling et al. | Apr. 27, 1920 |
| 1,625,905 | Murray | Apr. 26, 1927 |
| 1,722,520 | Glancy | July 30, 1929 |
| 1,959,538 | Langenhagen | May 22, 1934 |
| 2,135,531 | Reichert | Nov. 8, 1938 |
| 2,186,451 | Dutcher | Jan. 9, 1940 |
| 2,225,039 | Diggens | Dec. 17, 1940 |
| 2,306,853 | Wittig | Dec. 29, 1942 |
| 2,328,284 | McDonald et al. | Aug. 31, 1943 |
| 2,351,471 | Bailey | June 13, 1944 |
| 2,357,904 | Mulcrone | Sept. 12, 1944 |
| 2,364,768 | Aitcheson | Dec. 12, 1944 |
| 2,396,824 | Burroughs | Mar. 19, 1946 |

FOREIGN PATENTS

| Number | Country | Date |
|---|---|---|
| 10,701 | Great Britain | 1906 |
| 18,667 | Great Britain | Sept. 18, 1901 |
| 23,825 | Great Britain | Dec. 9, 1914 |
| 286,273 | Germany | July 29, 1915 |
| 457,978 | Great Britain | Dec. 7, 1936 |